US009011984B2

(12) United States Patent
Allen et al.

(10) Patent No.: US 9,011,984 B2
(45) Date of Patent: Apr. 21, 2015

(54) PROCESSES FOR COATING SUBSTRATES AND SUBSTRATES FORMED THEREFROM

(71) Applicant: Bayer MaterialScience LLC, Pittsburgh, PA (US)

(72) Inventors: Kathy Allen, Scenery Hill, PA (US); Terrell Wayt, Moundsville, PA (US); Jeanette Eastman, McKees Rocks, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 13/964,414

(22) Filed: Aug. 12, 2013

(65) Prior Publication Data

US 2014/0120351 A1    May 1, 2014

Related U.S. Application Data

(60) Provisional application No. 61/720,004, filed on Oct. 30, 2012.

(51) Int. Cl.
| | |
|---|---|
| C08F 2/48 | (2006.01) |
| C09D 133/04 | (2006.01) |
| C09D 175/14 | (2006.01) |

(52) U.S. Cl.
CPC ............ *C09D 133/04* (2013.01); *C09D 175/14* (2013.01)

(58) Field of Classification Search
CPC ....... C08J 7/18; C09D 133/04; C09D 175/14; C09D 175/16
USPC ......................................... 427/508, 516, 514
See application file for complete search history.

(56) References Cited

U.S. PATENT DOCUMENTS

| | | | |
|---|---|---|---|
| 4,108,814 | A | 8/1978 | Reiff et al. |
| 4,380,604 | A | 4/1983 | Neuhaus et al. |
| 5,135,963 | A | 8/1992 | Haeberle |
| 5,684,081 | A | 11/1997 | Dannhorn et al. |
| 6,521,702 | B1 | 2/2003 | Weikard et al. |
| 6,541,536 | B2 | 4/2003 | Weikard et al. |

(Continued)

FOREIGN PATENT DOCUMENTS

| | | |
|---|---|---|
| DE | 3316592 A1 | 11/1984 |
| DE | 40404902 | 7/1992 |

OTHER PUBLICATIONS

P. K. T. Oldring (Ed.), Chemistry & Technology of UV & EB Formulations for Coatings, Inks & Paints, vol. 2, 1991, SITA Technology, London, pp. 123-135.

(Continued)

*Primary Examiner* — Elena T Lightfoot
(74) *Attorney, Agent, or Firm* — John E. Mrozinski, Jr.; Donald R. Palladino

(57) ABSTRACT

Processes for coating substrates and the related substrates are disclosed herein. A one-component base coating composition is applied onto a substrate and a one-component top coating composition is applied wet-on-wet onto the applied base coating composition. The coating compositions are based on aqueous acrylate/polyurethane dispersions. The top coating composition is applied after the applied base coating composition develops a pendulum hardness of at least 50% of the pendulum hardness that would be exhibited by the base coating composition after UV cure. The applied coatings exposed to UV radiation to simultaneously cure both the base coating composition and the top coating composition.

27 Claims, 1 Drawing Sheet

(56) References Cited

U.S. PATENT DOCUMENTS

| | | |
|---|---|---|
| 6,559,225 B1 | 5/2003 | Irle et al. |
| 6,710,120 B2 | 3/2004 | Gertzmann et al. |
| 6,787,627 B2 | 9/2004 | Melchiors et al. |
| 2008/0242757 A1 | 10/2008 | Dvorchak et al. |
| 2009/0053530 A1 | 2/2009 | Sommer et al. |

OTHER PUBLICATIONS

P. K. T. Oldring (Ed.), Chemistry & Technology of UV & EB Formulations for Coatings, Inks & Paints, vol. 2, 1991, SITA Technology, London, pp. 37-56.

Methoden der Organischen Chemie, Houben-Weyl, 4th Edition, vol. E20/Part 2, p. 1682, Georg Thieme Verlag, Stuttgart, 1987.

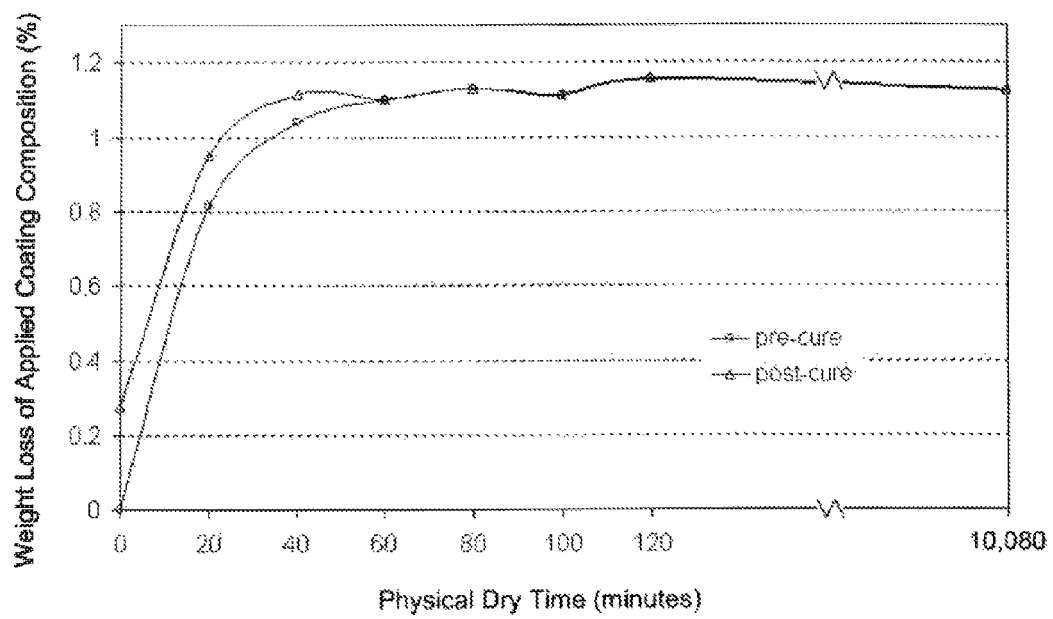

PROCESSES FOR COATING SUBSTRATES AND SUBSTRATES FORMED THEREFROM

TECHNICAL FIELD OF THE INVENTION

This disclosure generally relates to processes for coating substrates with one-component UV-curable waterborne coating compositions including binders comprising aqueous acrylate/polyurethane dispersions, and the substrates formed therefrom. The processes may be characterized by rapid physical drying and rapid chemical curing that facilitates a rapid return to service of various substrates.

BACKGROUND OF THE INVENTION

Polyurethane coatings are commonly used over functional and/or decorative floor coatings or as sealers for concrete, wood, metal, plastic, and the like. Such polyurethane coatings are often formulated as organic solvent-based systems because of factors such as, for example, the hydrophobicity and viscosity of polyurethane resins.

Interest in the use of water as an alternative carrier for polyurethane coatings has increased due to health, safety, and environmental concerns over the effects of volatile organic compounds (VOCs) and hazardous air pollutants (HAPs). As a result, waterborne polyurethane coating technologies have emerged as alternatives to solventborne coating technologies. Two-component waterborne polyurethane coating systems represent one such alternative to solventborne coating technologies.

Two-component waterborne polyurethane coating systems generally include a water-dispersible polyisocyanate component and a water-dispersible polyol or polyamine component. The two components are mixed to form an aqueous dispersion and applied to a substrate where the water evaporates and the isocyanate groups of the polyisocyanate component react with the hydroxyl groups or amine groups of the polyol or polyamine component to form a urethane- or urea-crosslinked coating. Two-component waterborne polyurethane coatings may exhibit many properties that are comparable to solventborne polyurethane coatings including, for example, abrasion resistance, chemical resistance, hardness, gloss, and the like. However, two-component waterborne polyurethane coatings may possess disadvantages relative to solventborne coating systems.

The physical drying rate and the chemical curing rate of two-component waterborne polyurethane coatings may be one such disadvantage. Two-component waterborne polyurethane coatings may physically dry and chemically cure at a slower rate than solventborne coating systems. This may be problematic for coating applications that require or would otherwise benefit from increased drying and curing rates and a rapid return to service of coated substrates. For example, coatings for flooring or other high traffic substrates may benefit from increased drying and curing rates and a rapid return to service when coated with waterborne polyurethane coatings.

SUMMARY OF THE INVENTION

Embodiments disclosed herein include a process for coating a substrate. The process comprises applying a base coating composition onto the substrate and then applying a top coating composition wet-on-wet onto the applied base coating composition. The wet-on-wet application is performed after the applied base coating composition develops a pendulum hardness of at least 50% of the pendulum hardness that would be exhibited by the base coating composition after UV cure. The base coating composition and the top coating composition are one-component waterborne coating compositions that respectively comprise an aqueous epoxy acrylate/polyurethane dispersion and a mixture of i) a second aqueous epoxy acrylate/polyurethane dispersion and ii) an aqueous polyester acrylate/polyurethane dispersion. The applied coating compositions are exposed to UV radiation to simultaneously cure both the base coating composition and the top coating composition.

Embodiments disclosed herein also include a process for coating a substrate comprising applying a base coating composition onto the substrate, and applying a top coating composition wet-on-wet onto the applied base coating composition after the applied base coating composition develops a pendulum hardness of at least 35 seconds. The base coating composition and the top coating composition are one-component waterborne coating compositions that respectively comprise an aqueous epoxy acrylate/polyurethane dispersion and a mixture of i) a second aqueous epoxy acrylate/polyurethane dispersion and ii) an aqueous polyester acrylate/polyurethane dispersion. The applied coating compositions are exposed to UV radiation to simultaneously cure both the base coating composition and the top coating composition.

It is understood that the invention disclosed and described herein is not limited to the embodiments disclosed in this Summary.

BRIEF DESCRIPTION OF THE DRAWINGS

Various characteristics of the non-limiting embodiments disclosed and described herein may be better understood by reference to the accompanying figure in which:

FIG. 1 is a plot of weight loss percentage versus elapsed physical dry time for an applied coating composition according to various embodiments described herein.

The reader will appreciate the foregoing details, as well as others, upon considering the following detailed description of various non-limiting embodiments according to the present disclosure. The reader also may comprehend additional details upon implementing or using embodiments described herein.

DETAILED DESCRIPTION OF THE INVENTION

It is to be understood that various descriptions of the disclosed embodiments have been simplified to illustrate only those features and characteristics that are relevant to a clear understanding of the disclosed embodiments, while eliminating, for purposes of clarity, other features and characteristics. Persons having ordinary skill in the art, upon considering the present description of the disclosed embodiments, will recognize that other features and characteristics may be desirable in a particular implementation or application of the disclosed embodiments. However, because such other features and characteristics may be readily ascertained and implemented by persons having ordinary skill in the art upon considering the present description of the disclosed embodiments, and are, therefore, not necessary for a complete understanding of the disclosed embodiments, a description of such features, characteristics, and the like is not provided herein. As such, it is to be understood that the description set forth herein is merely exemplary and illustrative of the disclosed embodiments and is not intended to limit the scope of the invention defined by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to "at least one") of the grammatical objects of the article. By way of example, "a component" means one or more components, and thus, possibly, more than one component is contemplated and may be employed or used in an implementation of the described embodiments.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this description. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicant reserves the right to amend the present disclosure to expressly recite any subject matter, or portion thereof, incorporated by reference herein.

The present disclosure includes descriptions of various embodiments. It is to be understood that all embodiments described herein are exemplary, illustrative, and non-limiting. Thus, the present disclosure is not limited by the description of the various exemplary, illustrative, and non-limiting embodiments. Rather, the invention is defined by the claims, which may be amended to recite any features or characteristics expressly or inherently described in or otherwise expressly or inherently supported by the present disclosure. Further, Applicants reserve the right to amend the claims to affirmatively disclaim features or characteristics that may be present in the prior art. Therefore, any such amendments would comply with the requirements of 35 U.S.C. §112, first paragraph, and 35 U.S.C. §132(a). The various embodiments disclosed and described herein can comprise, consist of, or consist essentially of the features and characteristics as variously described herein.

Various embodiments include processes for coating substrates with one-component UV-curable waterborne coating compositions including one or more aqueous acrylate/polyurethane dispersions. Like two-component waterborne polyurethane coating systems, one-component systems comprising aqueous polyurethane dispersions include very low or near-zero VOC/HAPs. In two-component systems the polyisocyanate component and the polyol or polyamine component are separately contained and only combined at a time relatively close to application onto a substrate. Unlike two-component systems, one-component systems cannot include both free polyisocyanate components and free polyol or polyamine components because the pot life of the system would be unacceptably short. As a result, unless blocked polyisocyanates are used, one-component waterborne systems cannot chemically crosslink via isocyanate-hydroxyl or isocyanate-amine reaction mechanisms.

However, one-component UV-curable waterborne coating compositions, as described herein, allow for rapid physical drying and chemical curing with a resulting high crosslink density. These materials include binders comprising acrylate/polyurethane macromolecules dispersed in an aqueous medium. The unsaturated acrylate functionality of the binder allows for chemical crosslinking of the macromolecules via a free-radical or ionic polymerization mechanism initiated by photo-initiator compounds that produce free-radical or ionic moieties when exposed to UV radiation. The properties of the resulting cured coatings are comparable to the properties exhibited by cured two-component waterborne coatings.

As used herein, the term "cure" and variations thereof used in connection with a composition (e.g., a "cured" or "curable" composition) shall mean that any crosslinkable or co-reactive components of the composition are at least partially chemically crosslinked or co-reacted such that the molecules constituting the composition are at least partially covalently bonded together.

As used herein, the term "polyurethane" refers to polymeric or oligomeric materials comprising urethane groups, urea groups, or both. The term "polyurethane" also refers to polymeric or oligomeric resins or crosslinked polymer networks comprising urethane groups, urea groups, or both.

As used herein, the term "aqueous polyester acrylate/polyurethane" refers to polymeric macromolecules comprising ester groups, at least one of acrylate groups or methacrylate groups, at least one of urethane groups or urea groups, and at least one of an ionic group, a potentially ionic group, or hydrophilic ether groups.

As used herein, the term "aqueous epoxy acrylate/polyurethane" refers to polymeric macromolecules comprising epoxy groups, at least one of acrylate groups or methacrylate groups, at least one of urethane groups or urea groups, and at least one of an ionic group, a potentially ionic group, or hydrophilic ether groups.

As used herein, the term "polyisocyanate" refers to compounds comprising at least two free isocyanate groups. Polyisocyanates include diisocyanates and diisocyanate reaction products comprising, for example, biuret, isocyanurate, uretdione, urethane, urea, iminooxadiazine dione, oxadiazine trione, carbodiimide, acyl urea, and/or allophanate groups. As used herein, the term "polyol" refers to compounds comprising at least two free hydroxyl groups. Polyols include polymers and/or oligomers comprising at least two pendant and/or terminal hydroxyl groups. As used herein, the term "polyamine" refers to compounds comprising at least two free amine groups. Polyamines include polymers and/or oligomers comprising at least two pendant and/or terminal amine groups.

In various embodiments, a process for coating a substrate comprises applying a two coat system wet-on-wet wherein the two coating layers are simultaneously cured by a single application of UV radiation, As used herein, the term "wet-on-wet" refers to the application of a UV-curable waterborne coating composition onto a previously applied UV-curable waterborne coating composition before the previously applied coating composition is cured by the application of UV radiation.

Conventional two-component waterborne polyurethane coating systems often require more than 24 hours between the time a coating layer is applied onto a substrate to the time that the coating layer is sufficiently cured so that the previous coating layer may be overcoated or the substrate ready for further processing or service. For multiple layer applications of two-component waterborne polyurethane coatings, the time that a substrate is unavailable during drying and curing can be in excess of 48 hours. In various sectors of the coatings industry, such as, for example, floor coatings, this may create large inefficiencies. For example, a walk-on time of over 24 hours for a floor coating may create significant time out-of-service during which other operations, such as topcoating, cannot be performed.

However, the present inventors have discovered that multiple layers of one-component UV-curable waterborne coating compositions comprising aqueous acrylate/polyurethane dispersions can be applied to a substrate wet-on-wet and simultaneously cured by a single application of UV radiation. This process significantly reduces the time between initial liquid coating application and the development of a solid UV-cured dual-layer coating, which results in increased coating efficiency and a rapid return to service of coated substrates, such as, for example, coated floors.

Aqueous acrylate/polyurethane dispersions suitable for use in the disclosed processes include, for example, the materials described in U.S. Pat. Nos. 4,380,604; 5,135,963; 5,684,081; 6,521,702; 6,541,536; 6,559,225; 6,710,120; 6,787,627; 2008/0242757; 2009/0053530; (each of which is incorporated in their entirety by reference herein).

In various embodiments, one-component UV-curable waterborne coating compositions may comprise aqueous polyester acrylate/polyurethane dispersions comprising a reaction product of the following components:
  A) one or more unsaturated hydroxy-functional polyester acrylate polymers;
  B) one or more dispersant compounds containing ionic groups, potentially ionic groups, and/or hydrophilic ether groups and groups reactive towards isocyanate groups;
  C) optionally, one or more polyols; and
  D) one or more polyisocyanates; together with a subsequent reaction with
  E) one or more polyamines.

The hydroxy-functional unsaturated polyester acrylates (component A) useful herein have OH numbers of from about 40 to about 200 mg of KOH/g, or any sub-range therein, such as, for example, from about 100 to about 200 or from about 125 to about 180. To prepare hydroxy-functional polyester acrylates, for example, the following types of monomer constituents may be used:
  a) (Cyclo)alkanediols such as dihydric alcohols containing (cyclo)aliphatically bound hydroxyl groups. Examples include, but are not limited to, ethanediol; 1,2- and 1,3-propanediol; 1,2-, 1,3- and 1,4-butanediol; 1,5-pentanediol; 1,6-hexanediol; neopentyl glycol; cyclohexane-1,4-dimethanol; 1,2- and 1,4-cyclo-hexanediol; 2-ethyl-2-butylpropane-diol; 2-methy-propane-1,3-diol; and diols containing ether oxygen(s) such as diethylene glycol, triethylene glycol, tetraethylene glycol, dipropylene glycol, tripropylene glycol, polyethylene glycols, polypropylene glycols, and polybutylene glycols. Reaction products of the aforementioned diols with ε-caprolactone or other lactones may likewise be employed as suitable diols.
  b) Alcohols with a hydroxy-functionality of three or more. Examples include, but are not limited to, glycerol; trimethylolpropane; pentaerythritol; dipentaerythritol; and sorbitol; or polyethers prepared starting from these alcohols (such as a reaction product of 1 molar equivalent of trimethylolpropane with 4 molar equivalents of ethylene oxide).
  c) Monoalcohols such as, for example but not limited to, ethanol; 1- and 2-propanol; 1- and 2-butanol; 1-hexanol, 2-ethylhexanol; cyclohexanol; and benzyl alcohol.
  d) Dicarboxylic acids and/or their anhydrides. Examples include, but are not limited to, phthalic acid; phthalic anhydride; isophthalic acid; tetrahydrophthalic acid; tetrahydrophthalic anhydride; hexahydrophthalic acid; hexahydrophthalic anhydride; cyclohexane dicarboxylic acid; maleic anhydride; fumaric acid; malonic acid; succinic acid; succinic anhydride; glutaric acid; adipic acid; pimelic acid; suberic acid; sebacic acid; dodecanedioic acid; and hydrogenated dimer fatty acids.
  e) Higher polyfunctional carboxylic acids and/or their anhydrides, such as, for example, trimellitic acid and trimellitic anhydride.
  f) Monocarboxylic acids, such as, for example, benzoic acid; cyclohexane-carboxylic acid; 2-ethylhexanoic acid; caproic acid; caprylic acid; capric acid; lauric acid; and natural and synthetic fatty acids.
  g) Acrylic acid; methacrylic acid; and/or dimeric (meth)acrylic acid.

Suitable hydroxy-functional polyester acrylates may be prepared by reacting at least one constituent from group (a) or (b) with at least one constituent from group (d) or (e) and at least one constituent from group (g). Constituents of group (f) are optional.

In various embodiments, groups with an aqueous dispersing action may also be incorporated into these polyester acrylates. For instance, as an alcohol component, it is possible to use polyethylene glycols and/or polypropylene glycols. Examples of such compounds include, but are not limited to, alcohol-derived polyethylene glycols, polypropylene glycols, derivatives thereof, and copolymers thereof. In various embodiments, an approximately 1500 number average molecular weight polyethylene glycol and/or an approximately 500 number average molecular weight polyethylene glycol monomethyl ether may be incorporated into a polyester acrylate.

In various embodiments, the esterification reactions between hydroxy-functional compounds (groups (a) through (c)) and carboxy-functional compounds may be terminated before full reaction, thereby leaving excess non-reacted carboxyl groups and/or hydroxyl groups in the polyester molecules. For example, the reaction may be terminated once the OH value is within the range from 40-120 mg of KOH/g. In various embodiments, the equivalent ratio of carboxyl groups to hydroxyl groups in an esterification reaction mixture may be greater than 1, leaving excess non-reacted carboxyl groups in the polyester molecules.

After esterification, non-reacted carboxyl groups in the polyester (i.e., not reacted with hydroxyl groups to produce ester groups) may be reacted with mono-epoxides, di-epoxides, or poly-epoxides. Suitable epoxides (glycidyl ethers) include, for example, those of monomeric, oligomeric, or polymeric bisphenol A, bisphenol F, hexanediol, and/or butanediol, or their ethoxylated and/or propoxylated derivatives. This reaction between carboxyl groups and epoxide groups may be used to raise the OH number of the hydroxy-functional polyester acrylate, since one hydroxyl group is formed in each epoxide-carboxyl reaction. This reaction may be catalyzed by catalysts, such as, for example, triphenylphosphine, thiodiglycol, ammonium and/or phosphonium halides, and/or zirconium or tin compounds such as tin(II) ethylhexanoate, for example.

The preparation of hydroxy-functional polyester acrylates is further described, for example, in German Patent Nos. 4,040,290 and 3,316,592; and in P. K. T. Old ring (Ed.), *Chemistry & Technology of UV & EB Formulations For Coatings, Inks & Paints*, Vol. 2, 1991, SITA Technology, London, pp. 123-135 (each of which is incorporated by reference herein).

Hydroxy-functional polyester acrylates suitable for production of polyester acrylate/polyurethanes also include, for example, the Laromer™ line of acrylic ester resins commercially available from BASF.

Hydroxy-functional polyester acrylates may be incorporated into macromolecules by urethane-forming reactions between the hydroxyl groups of the polyester acrylate and the isocyanate groups of the polyisocyanates (component D). The hydroxy-functional polyester acrylate may be used in an amount of at least 40% by weight based on the total weight of components A through E. In various embodiments, the hydroxy-functional polyester acrylate may be used in an amount of from about 40% to about 90% by weight (based on the total weight of components A through E) or any sub-range therein, such as, for example, 40%-80%, 40%-70%, 50%-80%, or 50%-70%.

Dispersant compounds reactive towards isocyanate groups (component B) may contain ionic or potentially ionic groups, which may be either cationic or anionic in nature, that impart aqueous dispersability to macromolecules covalently incorporating the dispersant compounds. Dispersant compounds further contain one or more isocyanate-reactive groups, such as, for example, hydroxyl groups or amine groups. Cationic and anionic dispersant compounds include those containing, for example, sulfonium groups, ammonium groups, phosphonium groups, carboxylate groups, sulfonate groups, phosphonate groups, or groups that can be converted by salt formation into these groups (i.e., potentially ionic groups).

Suitable ionic or potentially ionic compounds include, for example, mono- and di-hydroxycarboxylic acids; mono- and di-aminocarboxylic acids; mono- and di-hydroxysulfonic acids; mono- and di-aminosulfonic acids; mono- and di-hydroxyphosphonic acids; mono- and di-aminophosphonic acids; and their salts. Suitable compounds include, for example, dimethylolpropionic acid; dimethylolbutyric acid; hydroxypivalic acid; N-(2-aminoethyl)-β-alanine; 2-(2-aminoethylamino) ethanesulfonic acid; ethylenediame-propyl- or butyl-sulfonic acid; 1,2- or 1,3-propylenediamine-β-ethyl-sulfonic acid; citric acid; glycolic acid; lactic acid; glycine; alanine; taurine; lysine; 3,5-diaminobenzoic acid; an adduct of isphorone diisocyanate (IPDI) and acrylic acid (see, e.g., European Patent No. 916,647) and its alkali metal and/or ammonium salts; an adduct of sodium bisulfite with but-2-ene-1,4-diol; polyethersulfonate; and the propoxylated adduct of 2-butenediol and NaHSO$_3$ (see, e.g., German Patent No. 2,446,440). In various embodiments, ionic or potential ionic compounds are those possessing carboxyl or carboxylate groups, sulfonate groups and/or ammonium groups. In various other embodiments, ionic compounds are those containing carboxyl and/or sulfonate groups as anionic or potentially anionic groups, such as the salts of N-(2-aminoethyl)-β-alanine; 2-(2-aminoethylamine)ethanesulfonic acid; the adduct of IPDI and acrylic acid; or dimethylolpropionic acid.

Dispersant compounds reactive towards isocyanate groups (component B) may contain hydrophilic ether groups that impart aqueous dispersibility to macromolecules covalently incorporating the dispersant compounds. Suitable compounds include, for example, polyether polyols and polyether polyamines. Exemplary compounds include, but are not limited to, alcohol-derived polyethylene glycols, polypropylene glycols, copolymers thereof, and monomethyl ethers thereof.

Dispersant compounds can be incorporated into macromolecules by urethane-forming or urea-forming reactions between the isocyanate-reactive groups that are present and isocyanate groups of a polyisocyanate (component D). In various embodiments, the dispersant compound is used in an amount from about 0.1% to about 20%, by weight (based on the total weight of components A through E), or any sub-range therein, such as, for example, 0.5%-20%, 1%-15%, 1%-8%, or 2%-15%.

Suitable optional polyols (component C) include, for example, propylene glycol, ethylene glycol, neopentyl glycol, and 1,6-hexane diol. In addition, oligomeric and polymeric polyols with a number average molecular weight up to 6000 may be used. For example, higher molecular weight polyols having known utility in polyurethane chemistry, such as, for example, polyester polyols, polyether polyols, and polycarbonate polyols may be used. In various embodiments, higher molecular weight polyols may have an average OH-functionality of 1.2-2.2. In various embodiments, any optional polyols used to produce polyester acrylate/polyurethanes contain no ionic groups or potentially ionic groups. In various embodiments, any optional polyols used to produce polyester acrylate/polyurethanes contain, if any, an insufficient amount of ether groups to have a dispersant effect on the overall polyester acrylate/polyurethane macromolecule.

Optional polyols may be incorporated into macromolecules by urethane-forming reactions between the hydroxyl groups that are present and isocyanate groups of a polyisocyanate (component D). In various embodiments, the optional polyols may be used in an amount from about 0% to about 30%, by weight (based on the total weight of components A through E), or any sub-range therein, such as, for example, 0%-20%.

Suitable polyisocyanates (component D) include, for example, aromatic polyisocyanates, araliphatic polyisocyanates, aliphatic polyisocyanates, cycloaliphatic polyisocyanates, or mixtures of any such polyisocyanates.

Suitable polyisocyanates may include monomeric organic diisocyanates represented by the formula, $R(NCO)_2$, in which R represents an organic group. In various embodiments, R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, or a divalent aromatic hydrocarbon group having 6 to 15 carbon atoms.

Examples of suitable diisocyanates include: 1,4-tetra-methylene diisocyanate; 1,6-hexamethylene diisocyanate (HDI); 2,2,4-trimethyl-1,6-hexamethylene diisocyanate; 2,4,4-trimethyl-1,6-hexamethylene diisocyanate; 1,12-dodecamethylene diisocyanate; cyclohexane-1,3- and -1,4-diisocyanate; 1-isocyanato-2-isocyanatomethyl cyclopentane; 1-isocyanato-3-isocyanatomethyl-3,5,5-trimethyl-cyclohexane (isophorone diisocyanate or IPDI), bis-(4-isocyanatocyclohexyl)-methane; 1,3- and 1,4-bis-(isocyanatomethyl)-cyclohexane; bis-(4-isocyanatocyclo-hexyl)-methane; 2,4'-diisocyanato-dicyclohexyl methane; bis-(4-isocyanato-3-methyl-cyclohexyl)-methane; $\alpha,\alpha,\alpha',\alpha'$-tetramethyl-1,3- and/or -1,4-xylylene diisocyanate; 1-isocyanato-1-methyl-4 (3)-isocyanatomethyl cyclohexane; 2,4- and/or 2,6-hexahydro-toluylene diisocyanate; 1,3- and/or 1,4-phenylene diisocyanate; 2,4- and/or 2,6-toluene diisocyanate; 2,4- and/or 4,4'-diphenylmethane diisocyanate (MDI); 1,5-diisocyanato naphthalene; isomers of any thereof; and combinations of any thereof.

Monomeric polyisocyanates containing three or more isocyanate groups such as 4-isocyanatomethyl-1,8-octamethylene diisocyanate and aromatic polyisocyanates such as 4,4', 4"-triphenylmethane triisocyanate and polyphenyl polymethylene polyisocyanates obtained by phosgenating aniline/formaldehyde condensates may also be used to prepare polyester acrylate/polyurethanes. Also suitable are polyisocyanate adducts prepared from monomeric polyisocyanates (including diisocyanates) and containing isocyanurate, uretdione, biuret, urethane, allophanate, iminooxadiazine dione, carbodiimide, and/or oxadiazinetrione groups.

In various embodiments, hexamethylene diisocyanate (HDI), isophorone diisocyanate (IPDI), the isomeric forms of bis(4,4'-isocyanatocyclohexyl)methane, or mixtures of any thereof may be used to prepare polyester acrylate/polyurethanes.

The polyisocyanate component (component D) may react with the isocyanate-reactive groups present in components A through C to form a polyurethane macromolecule comprising an unsaturated polyester acrylate component and a dispersant component comprising an ionic group, a potentially ionic group, or a polyether segment. In various embodiments, the polyisocyanate is used in an amount of from about 10% to about 50%, by weight (based on the total weight of components A through E), or any sub-range therein, such as, for example, 10%-40%, 10%-30%, 15%-50%, 15%-40%, 15%-30%, or 15%-25%.

The equivalent ratio of the isocyanate groups of component D to the sum of the isocyanate reactive groups of components A through C may be from about 1.2:1 to about 2.0:1 or from about 1.4:1 to about 1.6:1. In this manner, macromolecules formed as a reaction product of components A through D may have unreacted isocyanate groups.

Polyamines (component E) may serve to increase the molecular weight of the macromolecules by reacting with the unreacted isocyanate groups, for example. In various embodiments, polyamines may be reacted with the macromolecules after dispersal in water and, therefore, the polyamines should be more reactive than water towards isocyanate groups. Examples of suitable polyamines include, but are not limited to, ethylenediamine; 1,6-hexamethylenediamine; isophoronediamine; 1,3-phenylenediamine; 1,4-phenylenediamine; 4,4'-diphenylmethane-diamine; amino-functional polyethylene oxides or polypropylene oxides (e.g., the Jeffamine™ resins, D-series, available from Huntsman); triethylenetetramine; and hydrazine. In various embodiments, ethylene diamine and hydrazine may be used. The polyamines may be used in an amount of from about 0.1% to about 10% by weight (based on the total weight of components A through E), or any sub-range therein, such as, for example, 0.1%-3% or 0.5%-2%.

The sum of the weight percentages of components A through E total 100%, Variations in the amounts of materials can produce coatings with different properties such as abrasion resistance and chemical resistance, which allows for selection of the particular properties desired for any particular application.

In various embodiments, one-component UV-curable waterborne coating compositions may comprise aqueous epoxy acrylate/polyurethane dispersions comprising a reaction product of the following components:

A1) one or more unsaturated hydroxy-functional epoxy acrylate polymers;

B1) one or more dispersant compounds containing ionic groups, potentially ionic groups, and/or hydrophilic ether groups and groups reactive towards isocyanate groups;

C1) optionally, one or more polyols; and

D1) one or more polyisocyanates; together with a subsequent reaction with

E1) one or more polyamines.

As the hydroxy-functional epoxy acrylate (component A1), it is also possible to use compounds having suitable hydroxyl group content for subsequent reaction with polyisocyanates to form polyurethanes. Such compounds are described in P. K. T. Oldring (Ed.), *Chemistry & Technology of UV & EB Formulations For Coatings, Inks & Paints*, Vol. 2, 1991, SITA Technology, London, pp. 37-56. Hydroxyl-containing epoxy(meth)acrylates may be formed by reacting acrylic acid and/or methacrylic acid with epoxides (glycidyl compounds) of monomeric, oligomeric, or polymeric bisphenol A, bisphenol F, hexanediol and/or butanediol or their ethoxylated and/or propoxylated derivatives.

Components B1)-E1) correspond to components B)-E) described above in relation to the aqueous polyester acrylate/polyurethane dispersions. The compounds suitable for use as components B)-E) and their relative amounts used are suitable for use as components B1)-E1).

Examples of processes that may be used to produce the aqueous epoxy acrylate/polyurethane dispersions and the aqueous polyester acrylate/polyurethane dispersions include emulsifier/shear-force, acetone, prepolymer-mixing, melt-emulsification, ketimine, and spontaneous solids-dispersing processes (or processes derived therefrom). A description of these processes may be found, for example, in *Methoden der Organischen Chemie*, Houben-Weyl, 4th Edition, Volume E20/Part 2, p. 1682, Georg Thieme Verlag, Stuttgart, 1987. In various embodiments, the acetone process may be used to prepare the dispersions.

In an acetone process, for example, components A through C (or A1 through C1) are charged to a reactor to prepare an initial solution. A solvent that is miscible with water but inert to isocyanate groups can be added at this stage or after addition and reaction of the polyisocyanate component. Suitable solvents include, for example, acetone, methylethyl ketone, butanone, tetrahydrofuran, dioxan, acetonitrile, dipropylene glycol dimethyl ether, and 1-methyl-2-pyrrolidone. Furthermore, the known catalysts for accelerating the isocyanate-hydroxyl (urethanization) reaction (e.g., triethylamine; 1,4-diazabicyclo-[2.2.2]-octane; tin dioctoate; or dibutyltin dilaurate) can also be charged at the same time. Polyisocyanates (component D or D1) may be added dropwise to these mixtures.

In various embodiments, the conversion of components (A or A1, respectively) through (C or C1, respectively) with (D or D1, respectively) may be permitted only up to a degree of conversion of 65% to 95% of the isocyanate groups based on the total quantity of isocyanate groups in component (D or D1, respectively). The degree of conversion may be monitored by tracking the NCO content of the reaction mixture. In various embodiments, both spectroscopic measurements (IR or NIR spectra) and chemical analyses (titrations) of withdrawn samples may be used. After the desired NCO content has been reached, further reaction may be reduced by lowering the temperature. How far the reaction temperature needs to be lowered depends upon the reaction partners being used (in particular, the reactivity of the polyisocyanate components) and can be monitored by further tracking of the NCO content of the mixture.

If component B (or B1) contains potentially ionic groups after reaction of components A (or A1) through D (or D1) to form the macromolecules, the potentially ionic groups may be converted to ionic salt groups. In the case of acidic groups, bases such as ammonia, triethylamine, triethanolamine, potassium hydroxide, or sodium carbonate can be used to produce anionic groups in the macromolecules. In the case of basic groups, acids such as lactic acid, acetic acid, or succinic acid can be used to produce cationic groups in the macromolecules.

The reaction product of components A through D (or A1 through D1) may be introduced into water which contains a polyamine (component E or E1, respectively) or a water/polyamine mixture may be introduced into the reaction product. An increase in molecular weight of the macromolecules may then be produced in a final reaction step by reacting the remaining isocyanate groups in the macromolecules with amine groups to form the one-component aqueous acrylate/polyurethane dispersion. The quantity of polyamine employed may depend upon the content of unreacted isocyanate groups. It may be advantageous not to react all of the isocyanate groups that are still available with the polyamine component, but to convert only a portion of these groups. The unconverted isocyanate groups can then undergo reaction with water in the dispersion, if desirable.

The organic solvent (e.g., acetone) present in the aqueous dispersion can be distilled off to produce a co-solvent free formulation. The dispersions may be characterized by a solids content of from about 20% to about 60% by weight (based on the total weight of the aqueous dispersion), or any sub-range therein, such as, for example, 30%-55%, 30%-45%, or 35%-45%. In various embodiments, aqueous polyester acrylate/polyurethane dispersions may comprise solids particles having an average particle size of 50 nanometers to 150 nanometer (Horiba).

Aqueous polyester acrylate/polyurethane dispersions and epoxy acrylate/polyurethane dispersions suitable for use in the processes disclosed herein include the Bayhydrol® line of UV-curable aqueous polyurethane dispersions. For example, Bayhydrol® UV VP LS 2280 and/or Bayhydrol® UV VP LS 2317 may be used to formulate coating compositions finding utility in the disclosed processes.

In addition to the acrylate/polyurethane components, the dispersions may further include photo-initiators and optional auxiliary substances and additives, such as, for example, dispersants, fillers, pigments, dyes, flattening agents, drying agents, and/or other substances that find utility in coating compositions. Further, one-component UV-curable waterborne coating compositions including the acrylate/polyurethanes described herein may further include other binder resins including other polyurethane dispersions and/or polyacrylate dispersions, for example.

The dispersions can be applied as coating compositions onto a wide range of substrates by conventional techniques including, for example, spraying, rolling, blade-coating, pouring, brushing, or dipping. The disclosed processes may be used to coat any substrate that would benefit from a dual-layer protective surface coating. In various embodiments, the substrates may comprise a material selected from the group consisting of concrete, stone, brick, plastic, metal (including alloys), and wood. For example, substrates that may be coated according to various embodiments of the disclosed processes include, but are not limited to, concrete construction materials such as concrete floors or cinder block walls, vinyl floors, and wood floors.

Chemical crosslinking may be initiated by UV radiation chemistry. The UV curing may be triggered in the presence of photo-initiator compounds. A variety of photo-initiators may be added to the polyurethane dispersions before application as a coating composition. Photo-initiators generally produce free radicals when exposed to UV radiation, which initiate radical crosslinking reactions among the unsaturated functionality of the (meth)acrylate groups in the macromolecules. Suitable photo-initiators include, for example, aromatic ketone compounds such as benzophenones; alkylbenzophenones; 4,4'-bis(dimethylamino)benzophenone (Michler's ketone); anthrone; and halogenated benzophenones. Also suitable are acylphosphine oxides such as 2,4,6-trimethylbenzoyl-diphenylphosphine oxide; phenylglyoxylic ester; anthraquinone and its derivatives; benzil ketals; and hydroxyalkyl phenones.

Additional photo-initiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthra-quinone; p-diacetyl-benzene; 9,10-dibromoanthracene 9,10-dichloroanthracene; 4,4-dichlorobenzophenone; thioxanthone; isopropylthioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec-butoxy acetophenone; dimethoxyphenyl acetbphenone; propiophenone; isopropylthioxanthone; chlorothioxanthone; xanthone; and mixtures thereof.

There are also several suitable photo-initiators commercially available from Ciba® including Irgacure® 184 (1-hydroxy-cyclohexyl-phenyl-ketone); Irgacure® 500 (a 1:1 by weight mixture of benzophenone and 1-hydroxy-cyclohexyl-phenyl-ketone); Irgacure® 819 (bis(2,4,6-trimethylbenzoyl)-phenylphosphineoxide); Irgacure® 1850 (a 1:1 by weight mixture of bis(2,6-dimethoxybenzoyl)-2,4,4-trimethylpentyl-phosphine oxide and 1-hydroxy-cyclohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1[4-(methylthio)phenyl]-2-morpholono-propan-1-one); Darocur® MBF (a phenyl glyoxylic acid methyl ester); and Darocur® 4265 (a 50/50 mixture of bis(2,4,6-trimethylbenzoyl)-phenylphosphineoxide and 2-hydroxy-2-methyl-1-phenyl-propan-1-one).

Mixtures of any photo-initiator compounds may also be employed. The foregoing lists are meant to be illustrative only and are not meant to exclude any suitable photo-initiators known to those skilled in the art. If the curing mechanism is a free-radical mechanism, water-soluble peroxides or aqueous emulsions of insoluble photo-initiators may be suitable. Radical forming photo-initiators may be combined with accelerators in a known manner. The concentrations at which photo-initiators are effectively employed may be from about 0.1% to about 10%, by weight (based on solid binder weight), or any sub-range therein, such as, for example, 3%-7% or 1%-2.5%.

In various embodiments, a process for coating a substrate comprises applying a base coating composition onto a substrate and applying a top coating composition wet-on-wet onto the applied base coating composition. The base coating composition a first aqueous epoxy acrylate/polyurethane dispersion. The top coating composition comprises a mixture of a second aqueous epoxy acrylate/polyurethane dispersion and an aqueous polyester acrylate/polyurethane dispersion. The top coating composition may be a clearcoat composition and the base coating composition may be either a clearcoat composition or a pigmented composition.

An advantage of one-component waterborne coating compositions based on aqueous UV-curable acrylate/polyurethane dispersions is the ability of the applied coating composition to physically dry by water evaporation. The physical drying of an applied coating composition may progress through various stages such as set-to-touch, tack-free, and the like, which measure drying times (see, for example, ASTM D1640-03 and ASTM D5895-03). However, these measures may incorporate inherent subjectivity and do not necessarily account for the cohesion and structural integrity needed in a dry coating to perform further operations such as topcoating.

For example, in the context of floor coatings, the walk-on time at which an applied coating develops sufficient structural integrity so that the coating may be walked on without being damaged does not necessarily correlate with the time required to develop a set-to-touch or tack-free state. Conventional coating processes using one-component UV-curable waterborne coating compositions may require that a base coat is physically dried and chemically crosslinked before application of a top coat to ensure that the underlying base coat is not damaged during application of the top coat. Conventionally, dual-layer and multiple-layer one-component waterborne coatings may also require separate exposure of each applied coating layer to UV radiation to ensure sufficient curing through all of the coating layers.

However, according to the processes described herein, a top coating composition is applied wet-on-wet onto an applied base coating composition and the applied coating compositions are simultaneously exposed to UV radiation to cure both the base coating composition and the top coating composition with one UV cure operation. The wet-on-wet application of the top coating composition may be performed after the applied base coating composition develops a pendulum hardness value that is at least 50% of the pendulum hardness value that would be exhibited by the base coating composition after it is UV cured. An un-cured pendulum hardness value that is at least 50% of the cured pendulum hardness value may correlate with sufficient cohesion and structural integrity within an applied coating to ensure that the coating can be subjected to loading and subsequent processing, such as topcoating, without damaging the underlying base coating. For example, in the context of floor coatings, the walk-on time may correlate with the time elapsed between initial coating application and when the applied (physically drying) coating develops a pendulum hardness that is at least 50% of the pendulum hardness value that would be exhibited by the coating composition after it is UV cured.

In various embodiments, the applied base coating composition and the applied top coating composition may be exposed to UV radiation provided from an artificial UV radiation source, such as, for example, a mercury lamp. In various embodiments, the UV exposure may occur after the applied top coating composition develops a pendulum hardness of at least 50% of the pendulum hardness value that would be exhibited by the coating composition after it is UV cured.

In various embodiments, the applied base coating composition may develop a pendulum hardness of at least 50% of the pendulum hardness that would be exhibited by the coating composition after UV cure within 60 minutes physical dry time. The applied top coating composition may also develop a pendulum hardness of at least 50% of the pendulum hardness that would be exhibited by the coating composition after UV cure within 60 minutes physical dry time. In various embodiments, the applied base coating composition may develop a pendulum hardness of at least 40% of the pendulum hardness that would be exhibited by the coating composition after UV cure within 30 minutes physical dry time. The applied top coating composition may also develop a pendulum hardness of at least 40% of the pendulum hardness that would be exhibited by the coating composition after UV cure within 30 minutes physical dry time. In various embodiments, the applied base coating composition may develop a pendulum hardness of at least 35 seconds before the top coating composition is applied. In various embodiments, the applied base coating composition may develop a pendulum hardness of at least 39 seconds before the top coating composition is applied. In various embodiments, the applied base coating composition may develop a pendulum hardness of at least 40 seconds before the top coating composition is applied.

In various embodiments, the applied top coating composition may develop a pendulum hardness of at least 35 seconds before the applied coatings are exposed to UV radiation. In various embodiments, the applied top coating composition may develop a pendulum hardness of at least 39 seconds before the applied coatings are exposed to UV radiation. In various embodiments, the applied top coating composition may develop a pendulum hardness of at least 40 seconds before the applied coatings are exposed to UV radiation.

In various embodiments, the applied base coating composition may develop a pendulum hardness of at least 35 seconds within 60 minutes physical dry time. The applied top coating composition may also develop a pendulum hardness of at least 35 seconds within 60 minutes physical dry time. In various embodiments, the applied base coating composition may develop a pendulum hardness of at least 39 seconds within 60 minutes physical dry time. The applied top coating composition may also develop a pendulum hardness of at least 39 seconds within 60 minutes physical dry time.

In various embodiments, the applied base coating composition may develop a pendulum hardness of at least 40 seconds within 65 minutes physical dry time. The applied top coating composition may also develop a pendulum hardness of at least 40 seconds within 65 minutes physical dry time. In various embodiments, the applied base coating composition may develop a pendulum hardness of at least 40 seconds within 60 minutes physical dry time. The applied top coating composition may also develop a pendulum hardness of at least 40 seconds within 60 minutes physical dry time. In various embodiments, the applied base coating composition may develop a pendulum hardness of at least 30 seconds within 30 minutes physical dry time. The applied top coating composition may also develop a pendulum hardness of at least 30 seconds within 30 minutes physical dry time.

In various embodiments, the total elapsed time from application of the base coating composition to development a dual-layer UV-cured coating is less than 3 hours, and in some embodiments is less than 2.5 hours.

The resultant cured coatings exhibit good chemical resistance, good hydrolytic stability, and good toughness (i.e., flexibility and mechanical durability) that may be comparable with coatings produced from two-component waterborne compositions and solventborne compositions. In various embodiments, the applied coating composition may develop a pendulum hardness of approximately 35-40 seconds within 60 minutes after initial application due to physical drying under ambient conditions (72° F. and 50% relative humidity). In contrast, two-component waterborne coating compositions typically only develop a pendulum hardness of approximately 35-40 seconds around 24 hours after initial application due to chemical reaction (e.g., isocyanate-hydroxyl reaction) between the resin component and the binder component.

The simultaneous UV curing of both a base coating layer and a top coating layer according to various embodiments may result in at least partial inter-layer chemical crosslinking. Not to be bound by theory, it is believed that exposure to UV radiation causes photoinitiator compounds to initiate chemical crosslinking reactions in both the underlying base coating layer and in the overlying top coating layer. The wet-on-wet application of the top coating layer may allow the crosslinking reactions to bridge the interface between the base coating layer and the top coating layer, chemically integrating the separately applied layers. This may provide further advantages in terms of the material properties of the cured dual-layer coating. For example, inter-layer crosslinking may further enhance inter-layer adhesion.

The illustrative and non-limiting examples that follow are intended to further describe various non-limiting embodiments without restricting the scope of the embodiments. Persons having ordinary skill in the art will appreciate that variations of the Examples are possible within the scope of the invention as defined by the claims. All parts and percents are by weight unless otherwise indicated.

EXAMPLES

Example 1

A pigmented base coating composition was prepared comprising an aqueous epoxy acrylate/polyurethane dispersion. The pigmented base coating composition included the components presented in Table 1.

TABLE 1

| Component | Concentration (weight percent) |
|---|---|
| Bayhydrol ® UV VP LS 2280 | 63.08 |
| Ti-Pure ® R-960 | 22.39 |
| Disperbyk ®-190 | 2.93 |
| Byk ®-028 | 1.27 |
| Byk ®-348 | 0.97 |
| Borchi ® Gel LW 44 (10% in water) | 3.15 |
| Irgacure ® 819 DW | 3.78 |
| Dowanol ™ PnB | 2.43 |
| Total | 100 |

The pigmented base coating composition was prepared by adding the Bayhydrol® UV VP LS 2280 (epoxy acrylate polyurethane dispersion available from Bayer MaterialScience LLC), the Ti-Pure® R-960, and the Disperbyk®-190 into a dispersing mixer and mixing the components until a Hegman value of 7 was achieved. After a Hegman value of 7 was achieved, the remaining components were added to the dispersion and mixed for 60 seconds.

Example 2

A clear top coating composition was prepared comprising Bayhydrol® UV VP LS 2317 (aqueous polyester acrylate/polyurethane dispersion available from Bayer MaterialScience LLC) and an aqueous epoxy acrylate/polyurethane dispersion (epoxy acrylate polyurethane dispersion available from Bayer MaterialScience LLC). The clear top coating composition comprised the components presented in Table 2,

TABLE 2

| Component | Concentration (weight percent) |
|---|---|
| Bayhydrol ® UV VP LS 2280 | 53.98 |
| Bayhydrol ® UV VP LS 2317 | 35.99 |
| Dowanol ™ PnB | 3.6 |
| Water, DI | 4.5 |
| DSX ®-1514 | 0.09 |
| Byk ®-348 | 0.22 |
| Irgacure ® 500 | 0.90 |
| Byk ®-024 | 0.18 |
| Tego ® Foamex 822 | 0.54 |
| Total | 100 |

The clear top coating composition was prepared by adding each component listed in Table 2 in succession into a dispersing mixer until all of the components were blended into a homogeneous dispersion.

Example 3

A concrete substrate was coated with coating compositions prepared as described in Examples 1 and 2. The pigmented base coat (Example 1) was rolled into the substrate using a 75 mm nap roller. The base coat was allowed to physically dry for approximately 60 minutes at 72° F. and 50% relative humidity, resulting in a tack free film of 2-3 mils dry film thickness. At approximately 60 minutes after application of the pigmented base coat, the clear top coat (Example 2) was applied over the pigmented base coat using a 75 mm nap roller. The top coat was allowed to physically dry for approximately 60 minutes at 72° F. and 50% relative humidity, resulting in a tack free film of 2-3 mils dry film thickness (4-6 mils total film thickness). At approximately 60 minutes after application of the top coat, the substrate was exposed to UV radiation from a mercury lamp at 100% intensity with a line speed of 20 feet-per-minute. The single application of UV-radiation simultaneously cured both the underlying base coat layer and the overlying top coat layer. The total elapsed time from uncoated substrate to cured two-layer coating was approximately 2 hours, 15 minutes.

Example 4

The physical drying time was evaluated for the clear top coating composition prepared according to Example 2 and applied in the same manner as Example 3. Eight (8) glass substrates were wiped with methyl ethyl ketone. The top coating composition was applied to the substrates as 2-3 mil drawdowns. The initial weight of the coatings was determined from the known weight of the substrates and the measured weight of the coated substrates immediately after application of the coating formulation. The eight (8) substrates were then allowed to physically dry in air at 72° F. and 50% as respectively indicated in Table 3.

TABLE 3

| Physical dry time (minutes) | Initial weight (grams) | Weight after dry time and before UV cure (grams) | Weight after UV cure (grams) | Weight loss during dry time (%) | Total weight loss (%) |
|---|---|---|---|---|---|
| 0 | 61.6 | 61.6 | 61.5 | 0 | 0.28 |
| 20 | 61.7 | 61.2 | 61.1 | 0.81 | 0.95 |
| 40 | 61.7 | 61.0 | 61.0 | 1.04 | 1.11 |
| 60 | 61.5 | 60.8 | 60.8 | 1.10 | 1.10 |
| 80 | 61.5 | 60.8 | 60.8 | 1.13 | 1.13 |
| 100 | 61.5 | 60.8 | 60.8 | 1.11 | 1.11 |
| 120 | 61.6 | 60.9 | 60.9 | 1.15 | 1.16 |
| 10,080 (7 days) | 61.6 | 60.9 | 60.9 | 1.12 | 1.12 |

The weight of the coatings after the elapsed physical drying times were determined before cure as reported in Table 3. The coated substrates were then exposed to UV radiation from a mercury lamp at 100% intensity with a line speed of 20 feet-per-minute to cure the coatings. The weight of the coatings after curing by exposure to UV radiation was determined as reported in Table 3.

The weight loss percentages of the applied coatings (pre-cure and post-cure) were calculated and plotted against the physical drying times. The plots are presented in FIG. 1. In this context, weight loss percentage is a measure of water loss due to evaporation, which correlates with the physical drying of the applied coating formulations. As shown in FIG. 1, the weight loss percentage—and, therefore, the physical drying—of the applied coatings reached a plateau by approximately 60 minutes elapsed dry time.

The applied coatings that were physically dried for more than 60 minutes did not exhibit any further appreciable weight loss. In addition, the total weight loss percentages measured post-cure (accounting for both physical drying and UV curing) were essentially equal to the pre-cure weight loss percentages (accounting for physical drying only) for coatings allowed to physically dry for 60 minutes or more. The weight loss percentages—a measure of the extent of physical drying of the applied coatings—were essentially equal whether the coatings were physically dried for 60 minutes, 7 days, or any time in between. This appears to indicate that the applied coating compositions according to the embodiments described herein reach a state of sufficient physical dryness at approximately 60 minutes.

Example 5

A coating composition was prepared comprising an aqueous epoxy acrylate/polyurethane dispersion. The coating composition comprised the components presented in Table 4.

TABLE 4

| Component | Concentration (weight percent) |
|---|---|
| Bayhydrol ® UV VP LS 2280 | 81.4 |
| Irgacure ® 819 DW | 5.8 |
| Dowanol ® PnB | 1.2 |
| Water | 11.6 |
| Total | 100 |

The coating composition was prepared by adding each component listed in Table 4 in succession into a dispersing mixer with a propeller blade at 1000 rpm until all of the components were blended into a homogeneous dispersion. The coating composition was applied to a substrate and the pendulum hardness (Konig according to ASTM D 4366) of the applied coating was measured at various time points during the physical drying of the coating in air at 72° F. and 50%, as indicated in Table 5. After 120 minutes of physical drying, the applied coating was exposed to UV radiation from a mercury lamp at 100% intensity with a line speed of 20 feet-per-minute to cure the coating. The pendulum hardness of the cured coating was measured immediately after UV exposure and then 24 hours after UV exposure. The results are presented in Table 5.

TABLE 5

| Elapsed Dry Time (minutes) | Pendulum Hardness (seconds) | Percentage of UV-cured hardness |
|---|---|---|
| 30 | 30.8 | 42.3% |
| 60 | 39.2 | 53.8% |
| 90 | 43.4 | 59.6% |
| 120 (pre-UV) | 43.4 | 59.6% |
| 120 (post-UV) | 72.8 | 100% |

The applied coating composition reached a local maximum pendulum hardness of 43.4 seconds for the physically dried coating, as indicated by the lack of change in the measured pendulum hardness at 90 minutes and 120 minutes elapsed drying time. By 60 minutes elapsed dry time, the applied coating composition developed a pendulum hardness value of over 50% of the pendulum hardness value exhibited by the cured coating composition after UV exposure. By 30 minutes elapsed dry time, the applied coating composition developed a pendulum hardness value of over 40% of the pendulum hardness value exhibited by the cured coating composition after UV exposure.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, characteristics, limitations, and the like, of the embodiments described herein. In this manner, Applicants reserve the right to amend the claims during prosecution to add features as variously described herein.

What is claimed is:

1. A process for coating a substrate, comprising:
applying a one-component waterborne base coating composition onto a substrate, the base coating composition comprising a first aqueous epoxy acrylate/polyurethane dispersion;
applying a one-component waterborne top coating composition wet-on-wet onto the applied base coating composition after the applied base coating composition develops a pendulum hardness of at least 50% of a pendulum hardness that would be exhibited by the base coating composition after UV cure, the top coating composition comprising a mixture of a second aqueous epoxy acrylate/polyurethane dispersion and an aqueous polyester acrylate/polyurethane dispersion; and exposing the applied coating compositions to UV radiation to simultaneously cure both the base coating composition and the top coating composition;

wherein the first aqueous epoxy aqueous acrylate/polyurethane dispersion may be the same or different than the second aqueous epoxy acrylate/polyurethane dispersion.

2. The process of claim 1, wherein the applied base coating composition develops a pendulum hardness of at least 50% of the pendulum hardness that would be exhibited by the base coating composition after UV cure within 60 minutes physical dry time.

3. The process of claim 1, wherein the applied coating compositions are exposed to UV radiation after the applied top coating composition exhibits a pendulum hardness of at least 50% of a pendulum hardness that would be exhibited by the top coating composition after UV cure.

4. The process of claim 3, wherein the applied top coating composition develops a pendulum hardness of at least 50% of the pendulum hardness that would be exhibited by the top coating composition after UV cure within 60 minutes physical dry time.

5. The process of claim 1, wherein the applied base coating composition develops a pendulum hardness of at least 40% of the pendulum hardness that would be exhibited by the base coating composition after UV cure within 30 minutes physical dry time.

6. The process of claim 1, wherein the applied base coating composition develops a pendulum hardness of at least 40 seconds within 65 minutes physical dry time.

7. The process of claim 1, wherein the applied base coating composition develops a pendulum hardness of at least 39 seconds within 60 minutes physical dry time.

8. The process of claim 1, wherein the applied base coating composition develops a pendulum hardness of at least 30 seconds within 30 minutes physical dry time.

9. The process of claim 1, wherein the applied top coating composition develops a pendulum hardness of at least 40 seconds within 65 minutes physical dry time.

10. The process of claim 1, wherein the total elapsed time from application of the base coating composition to development of a dual-layer UV-cured coating is less than 3 hours.

11. The process of claim 1, wherein the base coating composition is a pigmented composition and the top coating composition is a clearcoat composition.

12. The process of claim 1, wherein the base coating composition and the top coating composition are both clearcoat compositions.

13. The process of claim 1, wherein the first aqueous epoxy acrylate/polyurethane dispersion and second aqueous epoxy acrylate/polyurethane dispersion comprise a reaction product of components comprising:
A1) one or more unsaturated hydroxy-functional epoxy acrylate polymers;
B1) one or more dispersant compounds containing ionic groups, potentially ionic groups, and/or hydrophilic ether groups and groups reactive towards isocyanate groups;
C1) optionally, one or more polyols;
D1) one or more polyisocyanates; and
E1) one or more polyamines.

14. The process of claim 1, wherein the aqueous polyester acrylate/polyurethane dispersion comprises a reaction product of components comprising:
A) one or more unsaturated hydroxy-functional polyester acrylate polymers;
B) one or more dispersant compounds containing ionic groups, potentially ionic groups, and/or hydrophihc ether groups and groups reactive towards isocyanate groups;
C) optionally, one or more polyols;
D) one or more polyisocyanates; and
E) one or more polyamines.

15. The process of claim 1, wherein the substrate comprises a material selected from the group consisting of concrete, stone, brick, plastic, metal, and wood.

16. The process of claim 1, wherein the substrate is a floor.

17. A process for coating a substrate, comprising:
applying a one-component waterborne base coating composition onto a substrate, the base coating composition comprising a first aqueous epoxy acrylate/polyurethane dispersion;
applying a one-component waterborne top coating composition wet-on-wet onto the applied base coating composition after the applied base coating composition develops a pendulum hardness of at least 35 seconds, the top coating composition comprising a mixture of a second aqueous epoxy acrylate/polyurethane dispersion and an aqueous polyester acrylate/polyurethane dispersion, and
exposing the applied coating compositions to UV radiation to simultaneously cure both the base coating composition and the top coating composition.

18. The process of claim 17, wherein the applied base coating composition develops a pendulum hardness of at least 35 seconds within 60 minutes physical dry time.

19. The process of claim 17, wherein the applied base coating composition develops a pendulum hardness of at least 39 seconds within 60 minutes physical dry time.

20. The process of claim 17, wherein the applied base coating composition develops a pendulum hardness of at least 40 seconds within 65 minutes physical dry time.

21. The process of claim 17, wherein the total elapsed time from application of the base coating composition to development of a dual-layer UV-cured coating is less than 3 hours.

22. The process of claim 17, wherein the base coating composition is a pigmented composition and the top coating composition is a clearcoat composition.

23. The process of claim 17, wherein the base coating composition and the top coating composition are both clearcoat compositions.

24. The process of claim 17, wherein the first aqueous epoxy acrylate/polyurethane dispersion and second aqueous epoxy acrylate/polyurethane dispersion comprise a reaction product of components comprising:
A1) one or more unsaturated hydroxy-functional epoxy acrylate polymers;
B1) one or more dispersant compounds containing ionic groups, potentially ionic groups, and/or hydrophllic ether groups and groups reactive towards isocyanate groups;
C1) optionally, one or more polyols;
D1) one or more polyisocyanates; and
E1) one or more polyamines.

25. The process of claim 17, wherein the aqueous polyester acrylate/polyurethane dispersion comprises a reaction product of components comprising:
A) one or more unsaturated hydroxy-functional polyester acrylate polymers;

B) one or more dispersant compounds containing ionic groups, potentially ionic groups, and/or hydrophilic ether groups and groups reactive towards isocyanate groups;

C) optionally, one or more polyols;

D) one or more polyisocyanates; and

E) one or more polyamines.

26. The process of claim 17, wherein the substrate comprises a material selected from the group consisting of concrete, stone, brick, plastic, metal, and wood.

27. The process of claim 17, wherein the substrate is a floor.

* * * * *